United States Patent

[11] 3,549,023

| [72] | Inventor | Edward C. Backman<br>P.O. Box 916, Turlock, Calif. 95380 |
|---|---|---|
| [21] | Appl. No. | 733,872 |
| [22] | Filed | June 3, 1968 |
| [45] | Patented | Dec. 22, 1970 |

[54] AUTOMATIC BALE STACKING VEHICLE
30 Claims, 24 Drawing Figs.

[52] U.S. Cl..................................................... 214/6,
214/1
[51] Int. Cl...................................................B65g 57/32,
B65g 57/30
[50] Field of Search............................................. 214/6B, 6P

[56] References Cited
UNITED STATES PATENTS

| 3,373,882 | 3/1968 | Forest............................ | 214/6(B) |
| 3,445,006 | 5/1969 | Fleming........................ | 214/6(B) |
| 3,446,369 | 5/1969 | May et al...................... | 214/6(B) |
| 3,446,370 | 5/1969 | Clendenin et al............. | 214/6(B) |
| 3,159,287 | 12/1964 | Stroup........................... | 214/6(B) |
| 3,260,380 | 7/1966 | Skromme et al............. | 214/6(B) |
| 3,278,050 | 10/1966 | Tarbox.......................... | 214/6(B) |

*Primary Examiner*—Gerald M. Forlenza
*Assistant Examiner*—Robert J. Spar
*Attorney*—Townsend and Townsend ABSTRACT: An automatic bale stacking vehicle is disclosed wherein bales are lifted from the ground by a pickup conveyor and positioned by a bale receiving table on an elevator which raises the bales into position before a vertical turntable mounted for rotation on a mast above the elevator. Grasping means on the turntable retain a plurality of bales in a desired tying configuration thereon to form a layer of bales for stacking. The turntable and mast are mounted for longitudinal translation along the vehicle on tracks to push the formed layers of bales into a stacking framework in which a horizontal stack is formed. The stacking framework is pivotally mounted for unloading stacks of bales vertically onto trucks or onto the ground by a self-unloading tailgate.

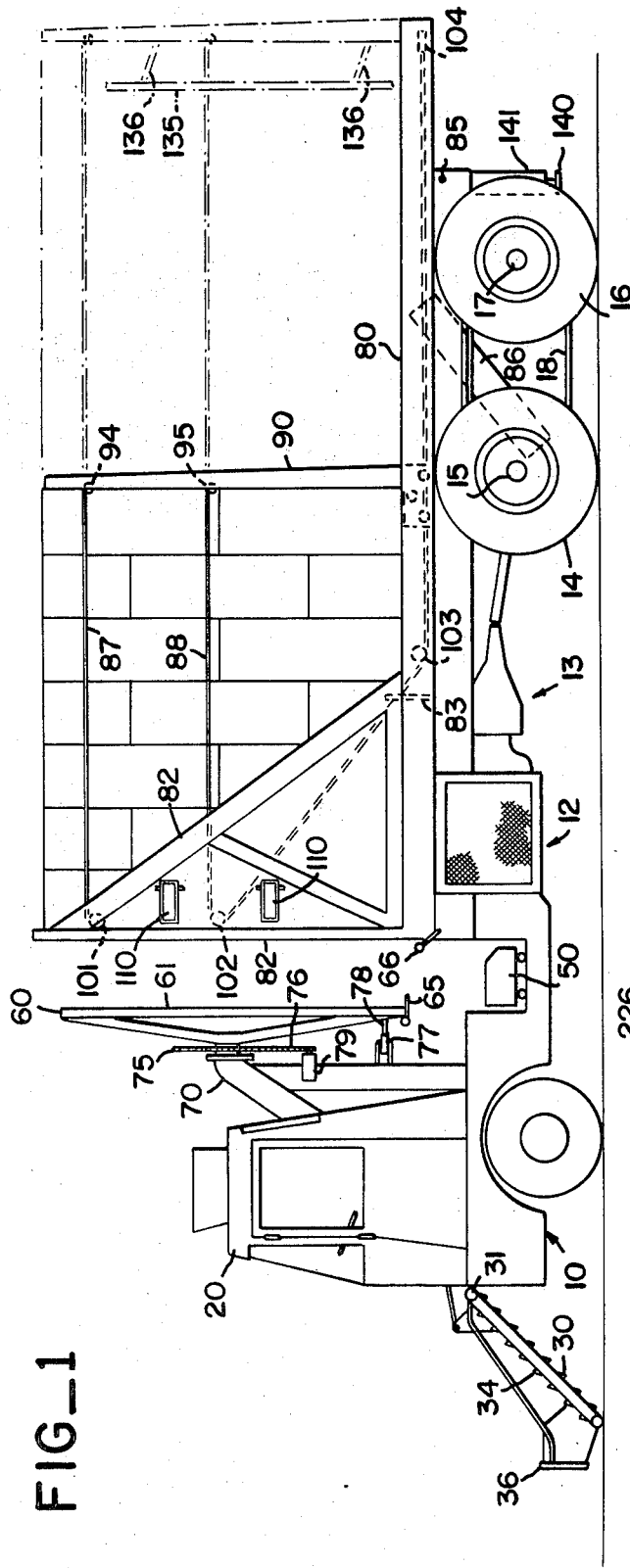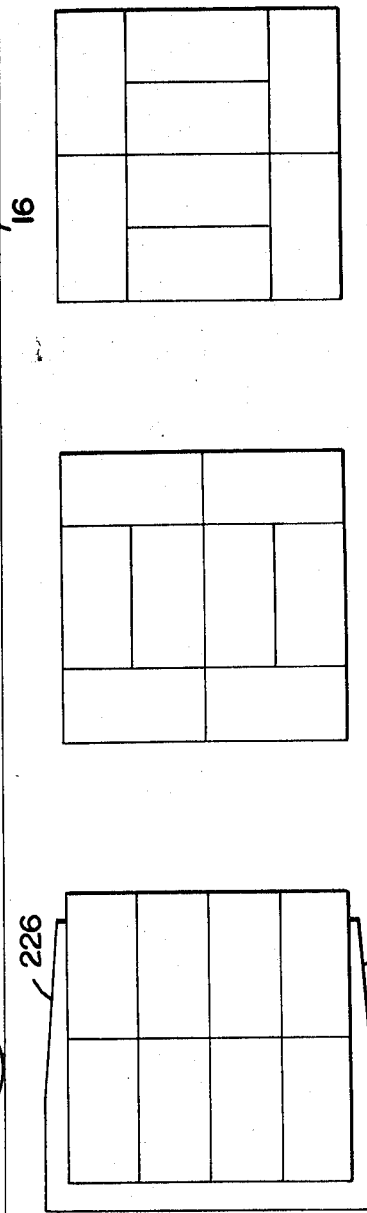

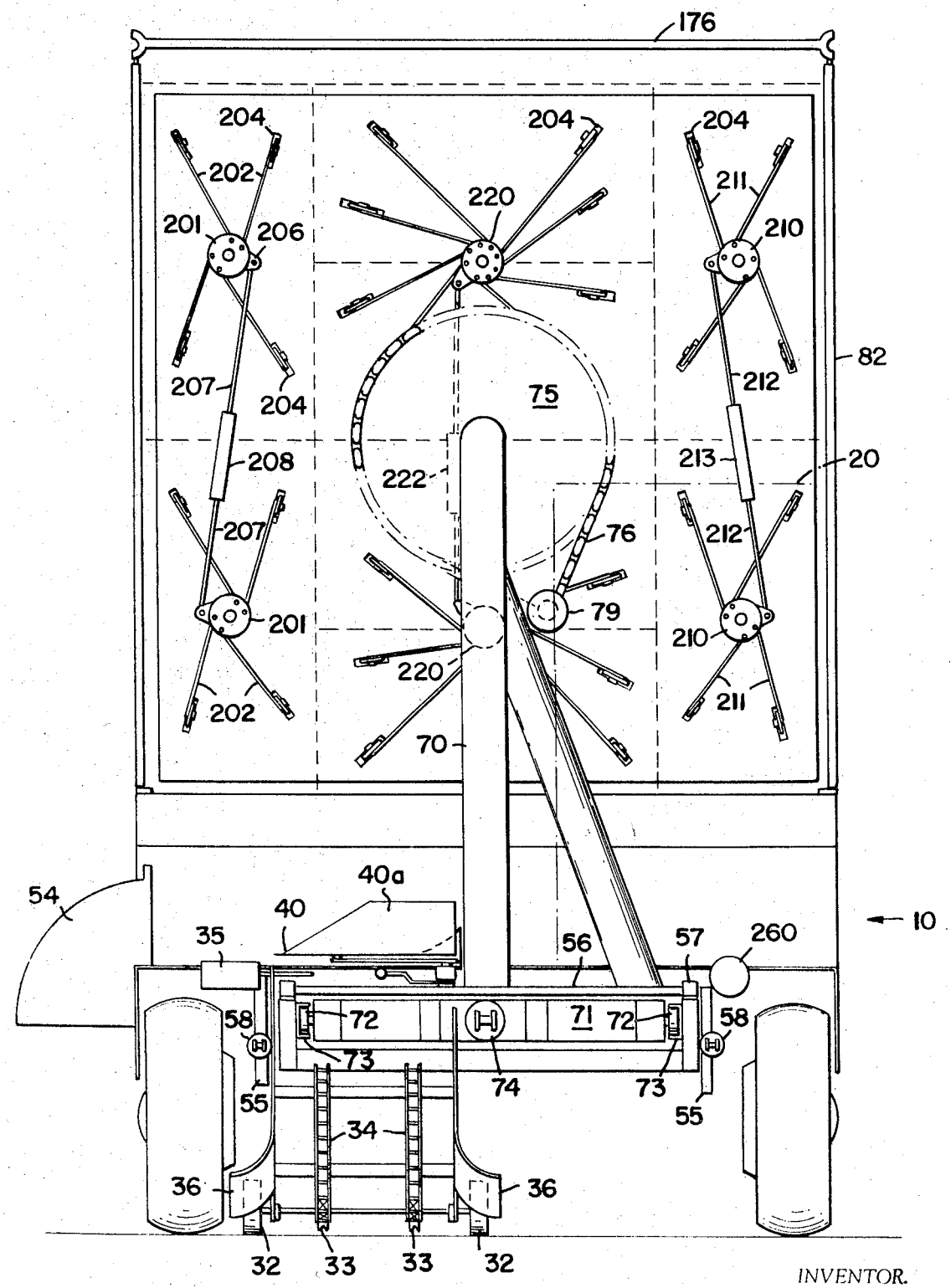
FIG_2

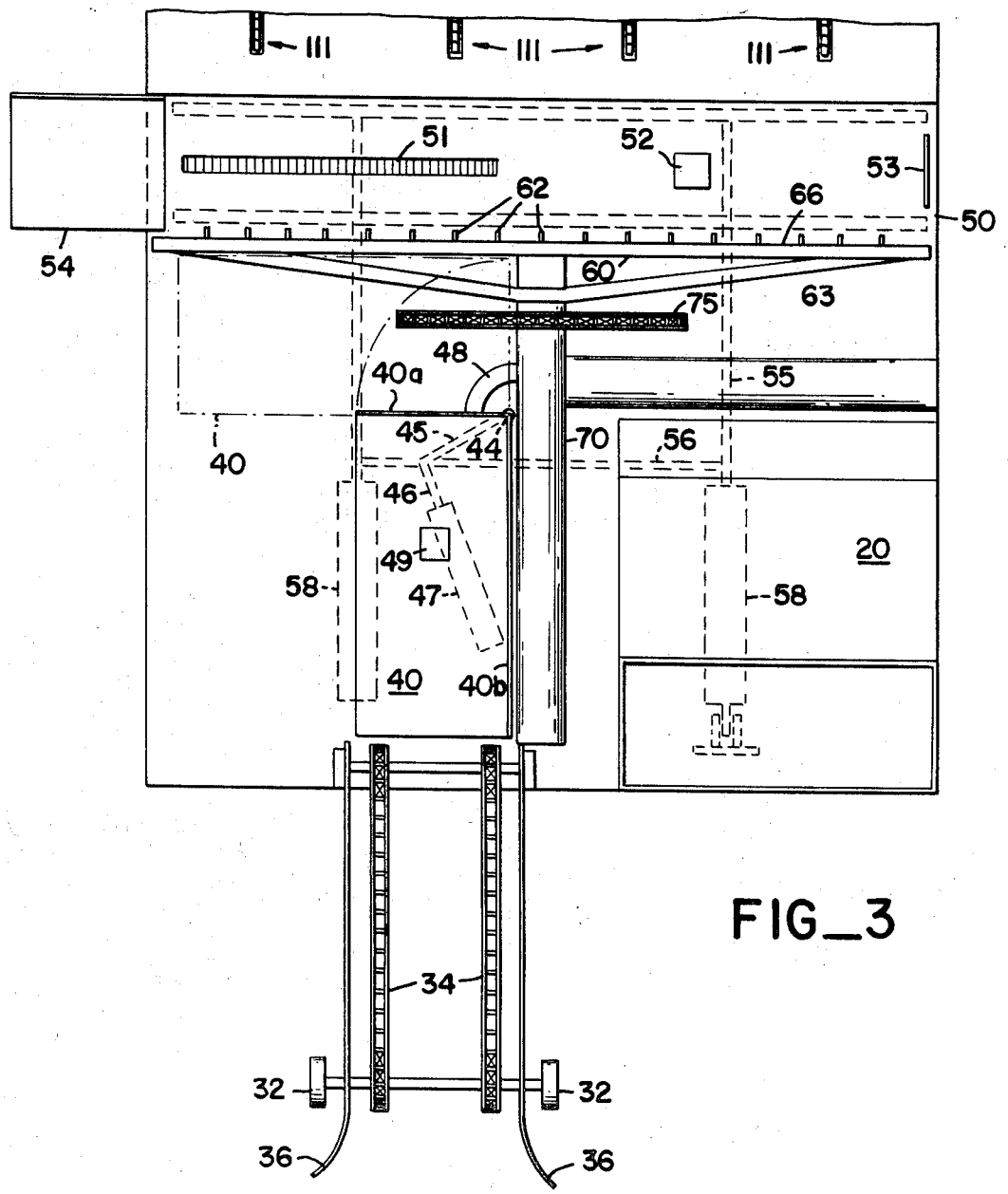
FIG_3
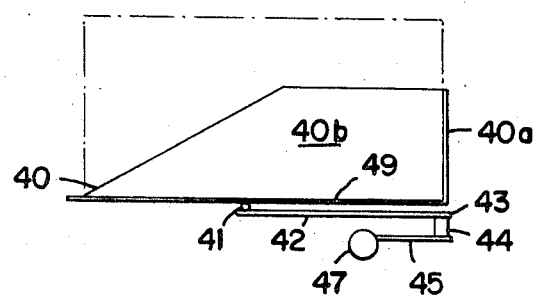
FIG_3A
INVENTOR.
EDWARD C. BACKMAN
BY
Townsend and Townsend
ATTORNEYS

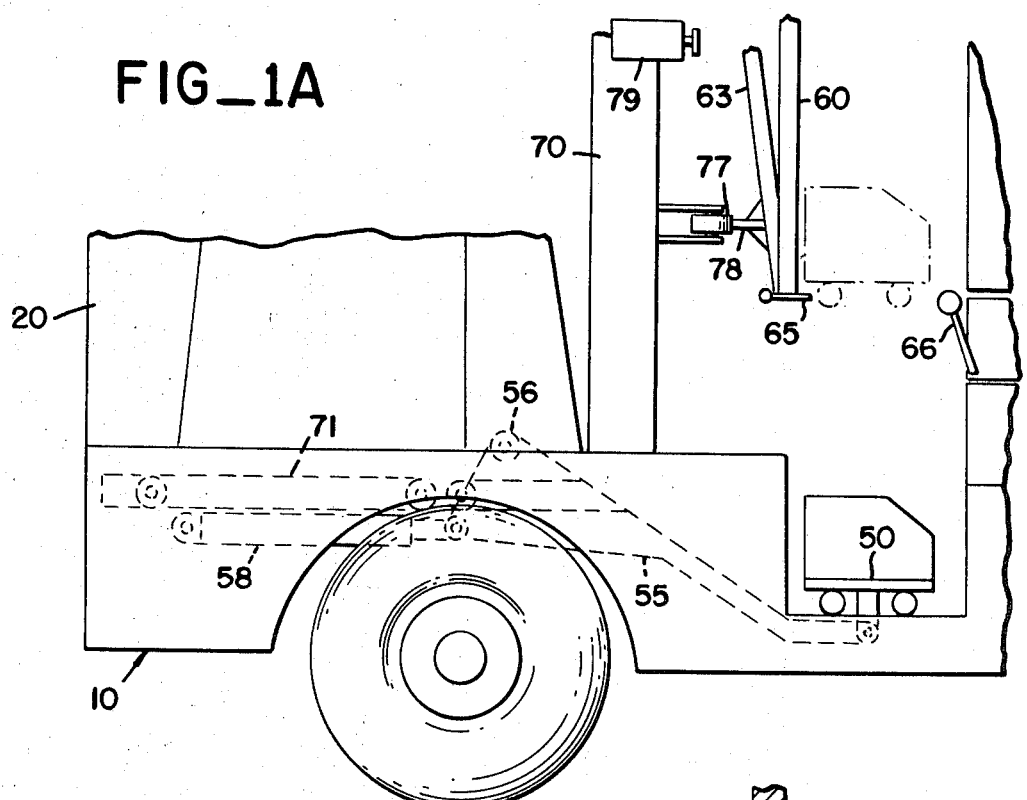
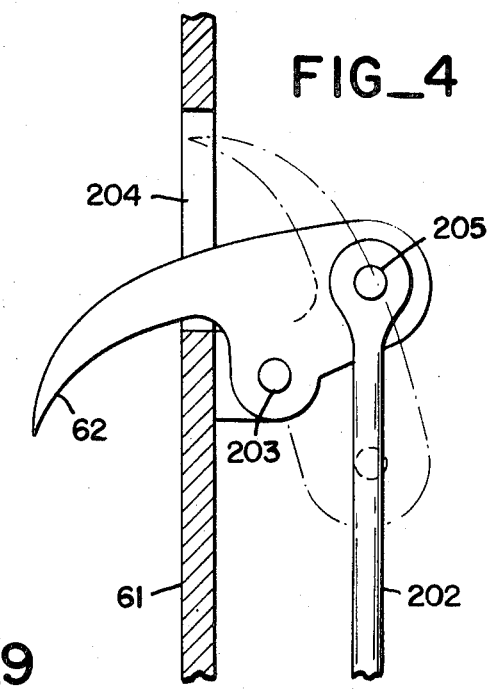
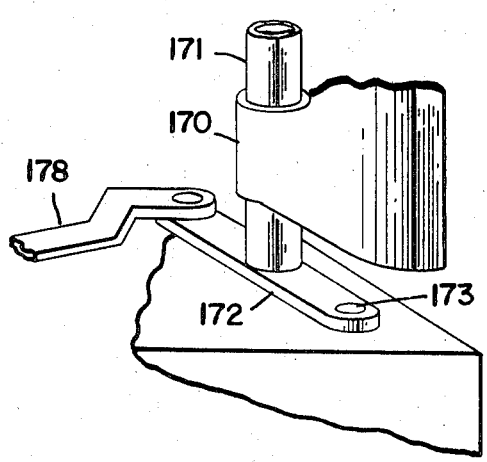
INVENTOR.
EDWARD C. BACKMAN

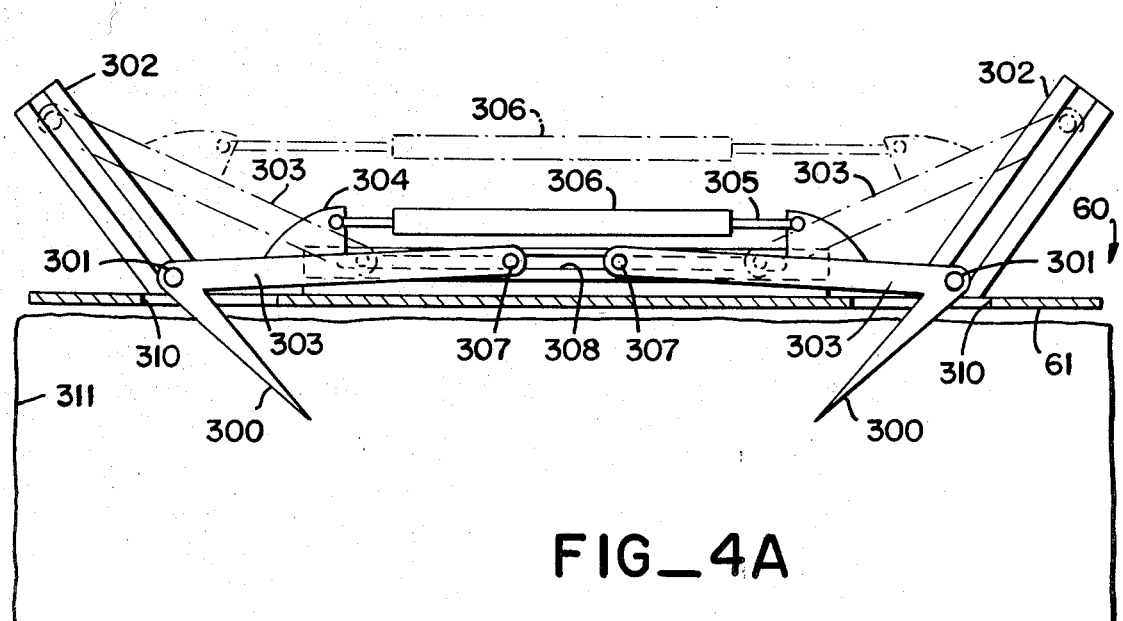
FIG_4A
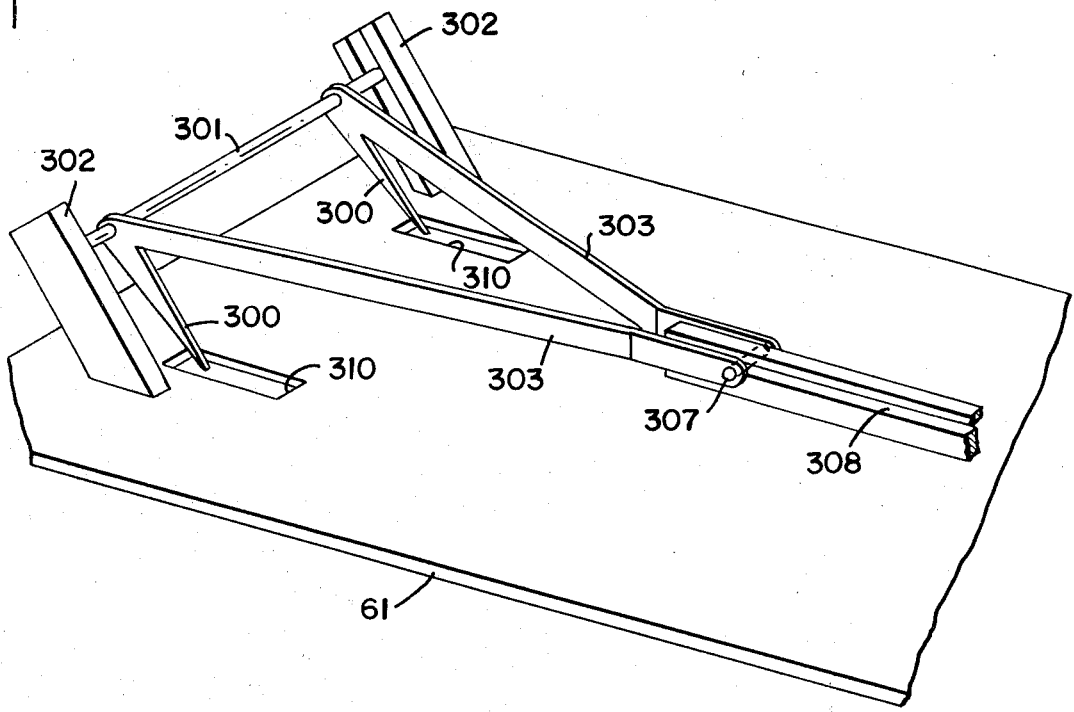
FIG_4B
INVENTOR.
EDWARD C. BACKMAN
BY
Townsend and Townsend
ATTORNEYS

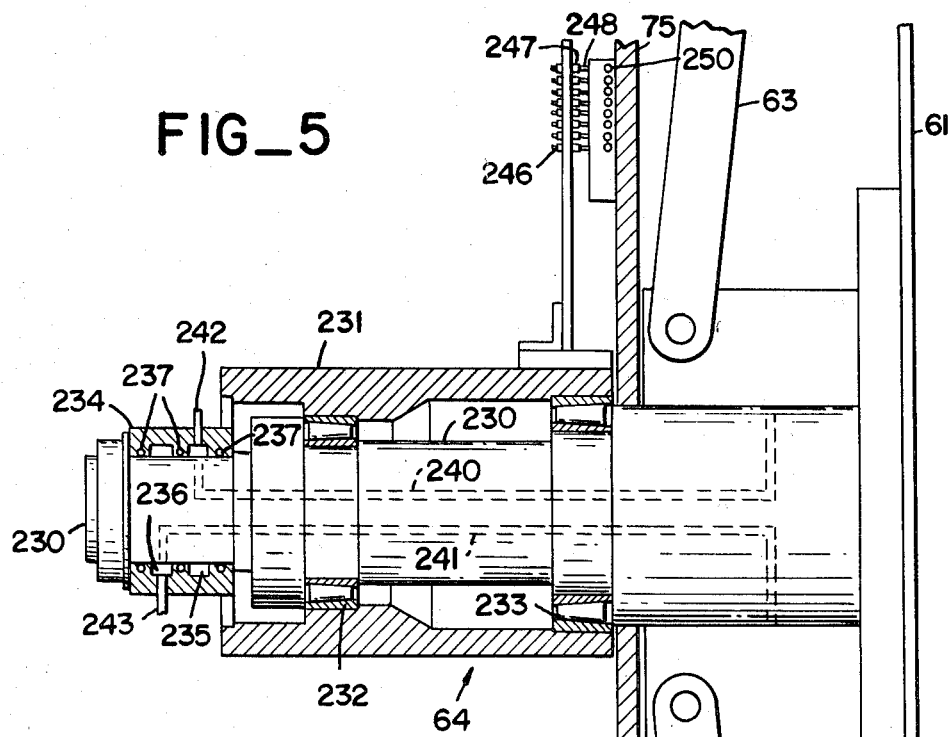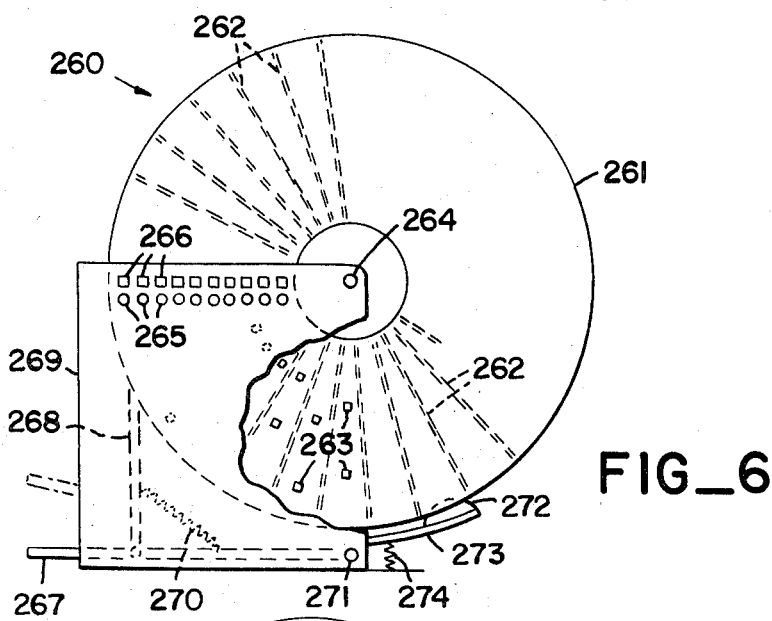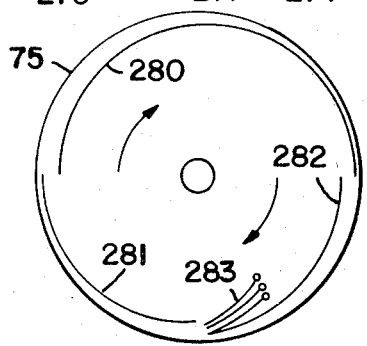

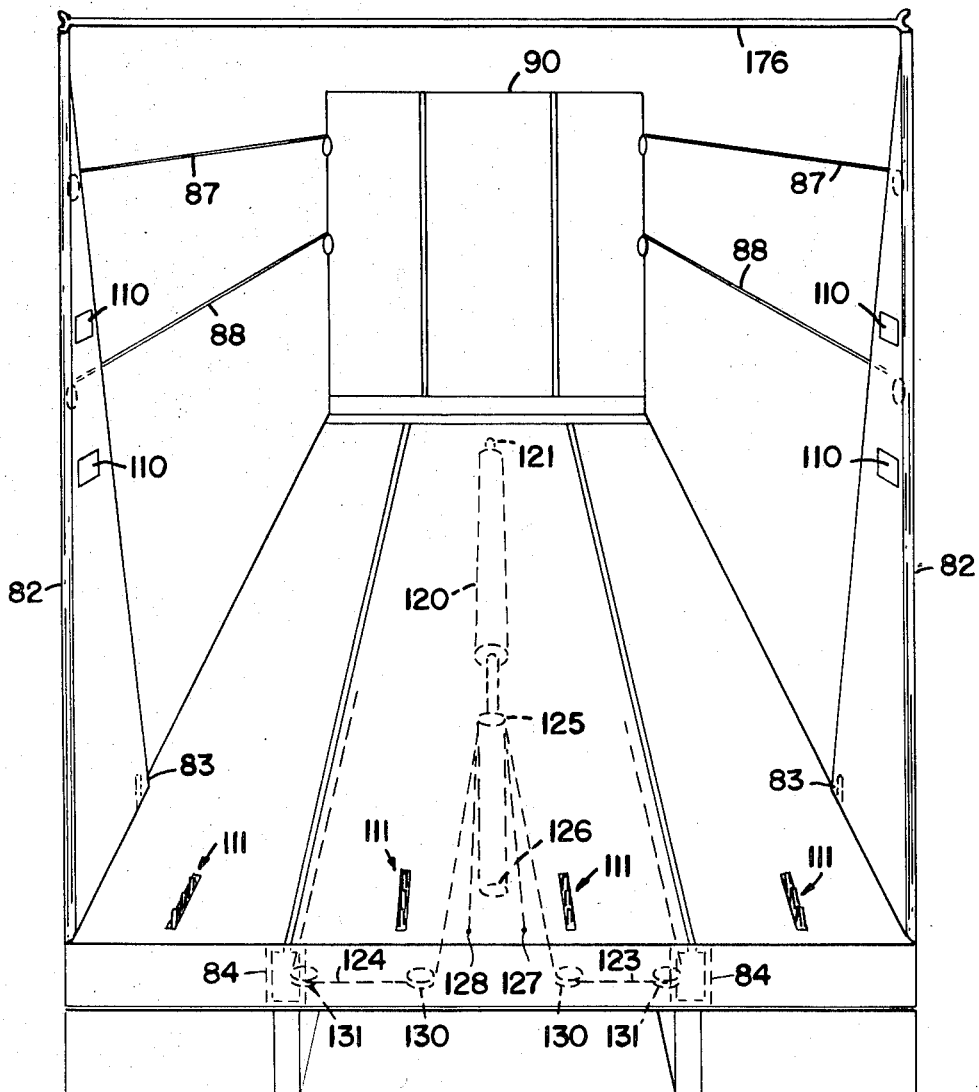
FIG_8
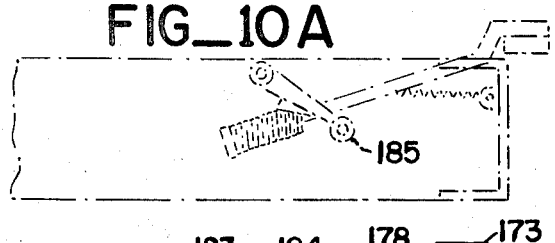
FIG_10A
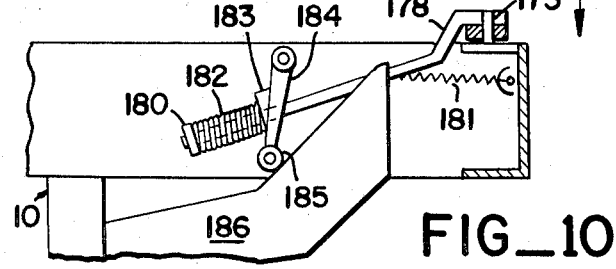
FIG_10
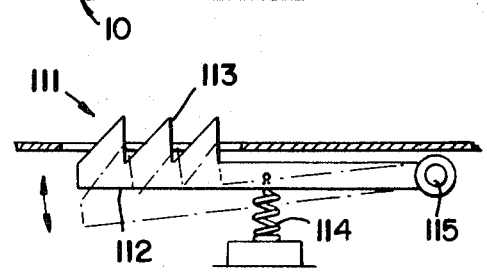
FIG_8A
INVENTOR.
EDWARD C. BACKMAN
BY
Townsend and Townsend
ATTORNEYS

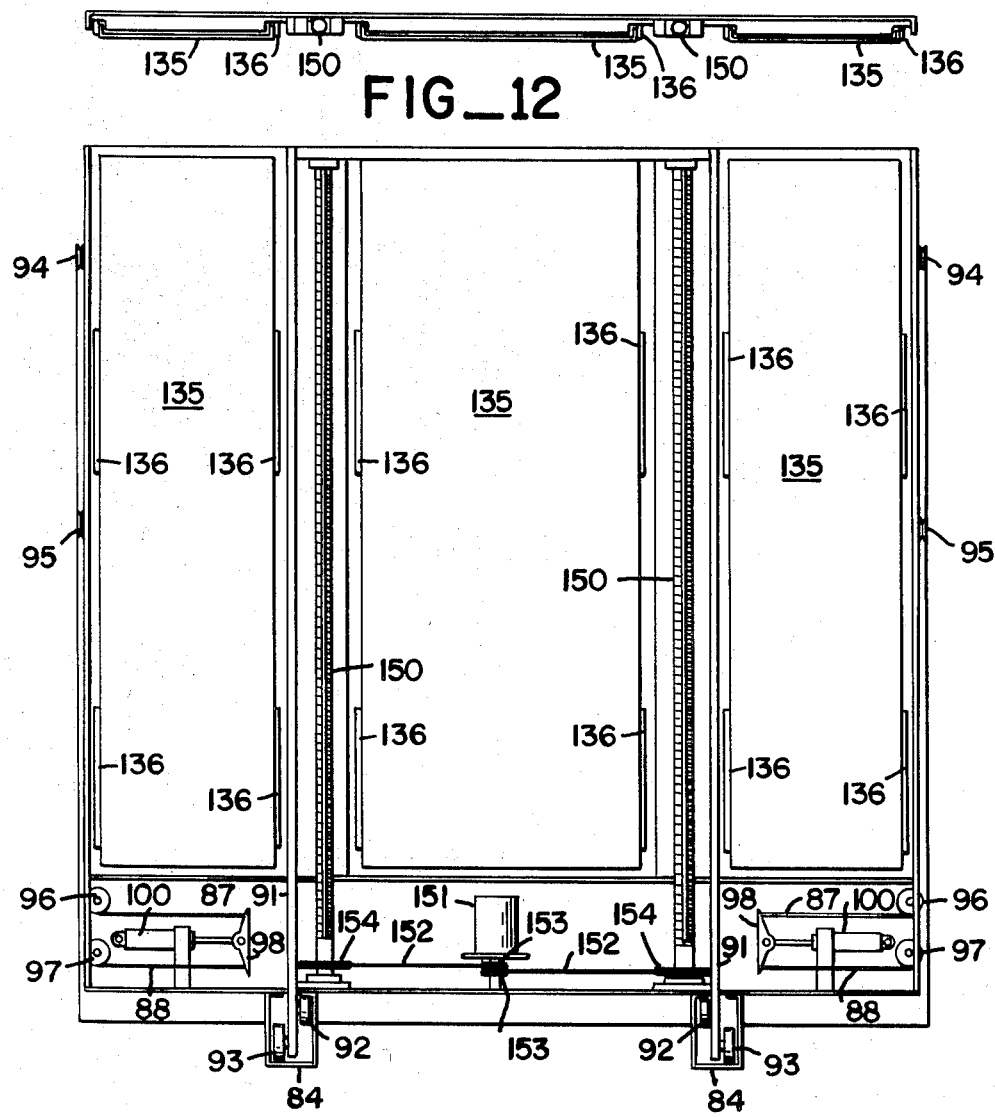
FIG_12
FIG_11
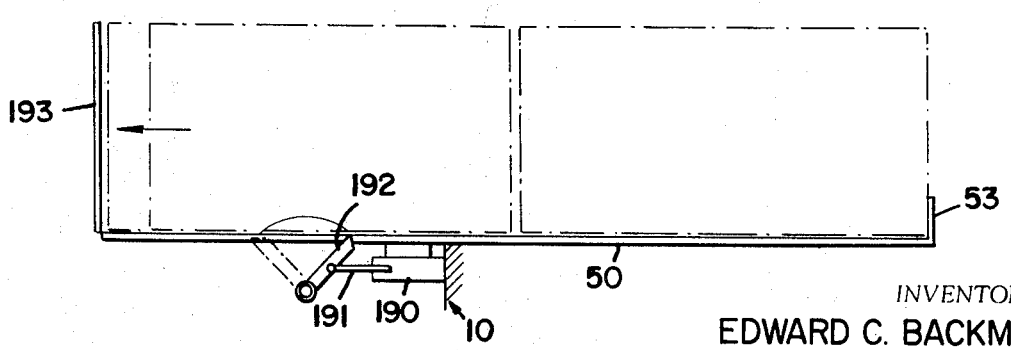
FIG_3B
INVENTOR.
EDWARD C. BACKMAN
BY
Townsend and Townsend
ATTORNEYS

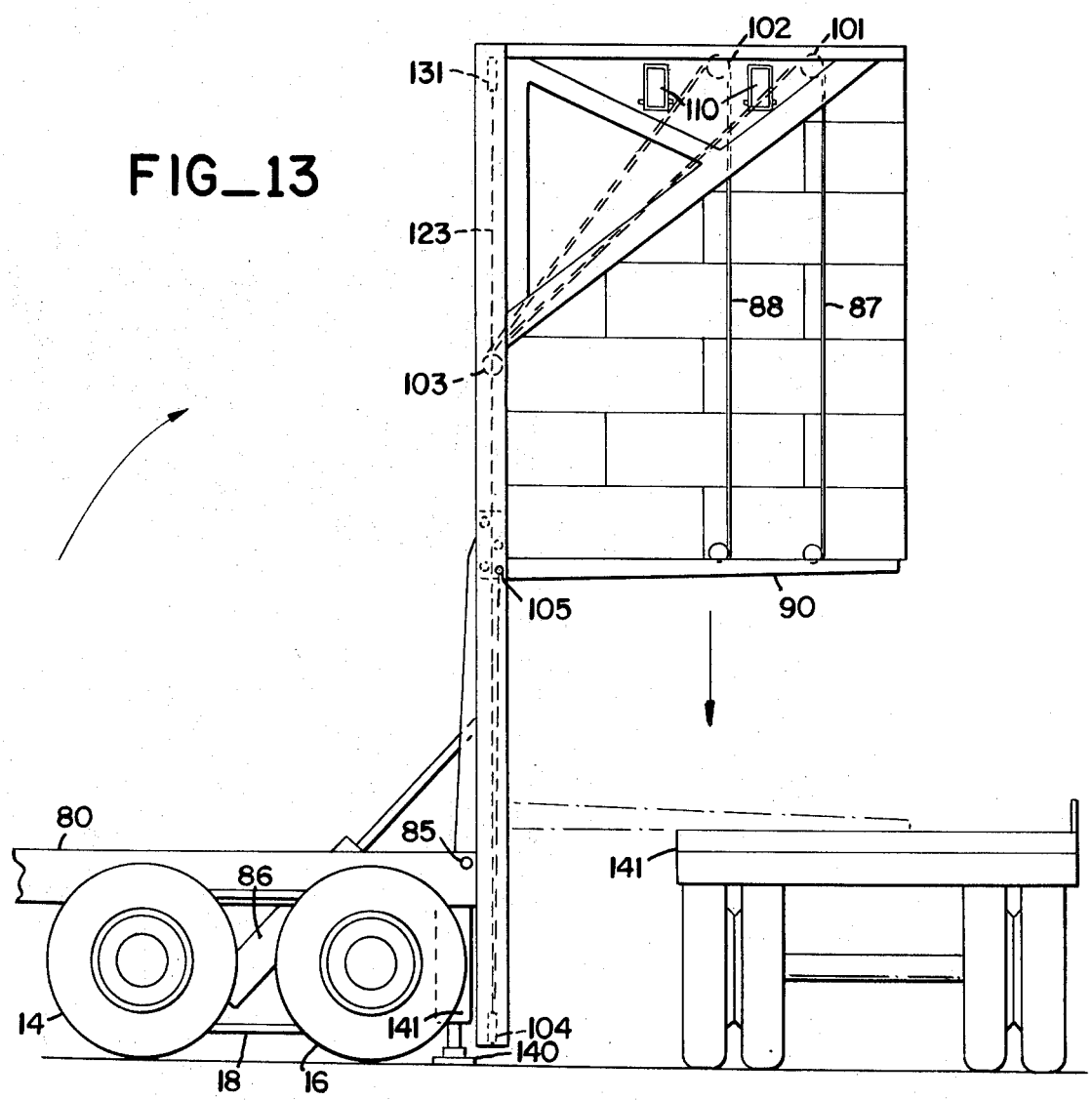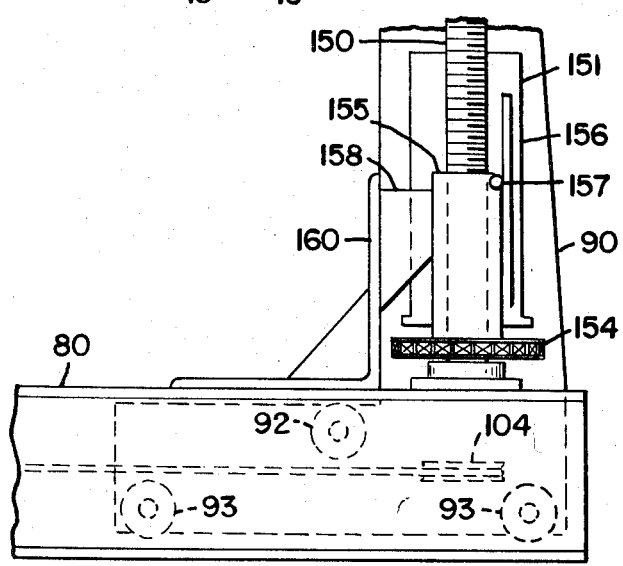
INVENTOR.
EDWARD C. BACKMAN
BY
Townsend and Townsend
ATTORNEYS 3,549,023

AUTOMATIC BALE STACKING VEHICLE

This invention relates to new and improved automatic bale stacking vehicles of the type capable of lifting baled products such as baled hay from the ground, stacking the baled product in a predetermined tying configuration to provide stability, and unloading the stacked bales on a truck or on the ground.

Bale stacking vehicles and bale wagons heretofore made though capable of picking up and stacking bales have been unable to automatically stack the bales in a configuration to provide maximum stability in the formed stack. Thus, orientation of the bales to provide frictional tying between layers of the stack for maximum stability has heretofore been done by hand. Furthermore, inefficient use has been made of the available space on the bale stacking vehicle or bale wagon because of the inordinate amount of space required for the bale stacking mechanism. Thus, only small loads have been obtainable and the height or width of the vehicle has often precluded practical highway transportation.

It is an object of the present invention to provide a new and improved fully automatic bale stacking vehicle capable of lifting bales from the ground and orienting the bales in successive layer configurations according to a programmed sequence to provide maximum stability in the formed stack by frictional tying between successive layers, and in which the bottom layer of the stack is arranged to permit transport of the entire stack by a squeeze forklift truck.

Another object of the invention is to provide an automatic bale stacking vehicle which makes efficient use of the load carrying capacity of the vehicle by stacking bale layers formed according to the programmed sequence in a load carrying framework extending substantially the length of the vehicle. Additionally, it is an object of the invention to provide means for automatically unloading formed stacks of bales on a truck or on the ground.

A further object of the invention is to provide an automatic bale stacking vehicle in which the pickup of bales from the ground occurs at the front of the vehicle and may be controlled by a driver and in which the vehicle is streamlined and adapted for highway transportation.

Another object of the invention is to provide a self-powered automatic bale stacking vehicle having a power plant and drive means and wherein the bale pickup conveyor for lifting bales from the ground is retractable for transport of bales stacked in the vehicle on highways or in the field.

In order to accomplish these results, the present invention contemplates the provision of an elongated trucklike vehicle including a chassis, wheels, power plant, and half-cab for the driver. According to the invention, a bale pickup conveyor is provided adjacent the half-cab at the front of the vehicle to lift bales extending in a longitudinal direction from the pickup conveyor onto a bale receiving table which rotates and dumps the bales on an elevator with the longitudinal axis of the bale transverse to the longitudinal axis of the vehicle. The bale pickup conveyor for lifting bales from the ground is positioned in front of the vehicle adjacent the operator so that the vehicle may be readily guided along bales lying in the field, and is retractable to permit fast highway transportation by the vehicle.

The invention also contemplates providing a vertical turntable mounted for rotation on a mast above the elevator. Bales are then sequentially and selectively positioned before the turntable according to the position of the bale on the elevator and the angular orientation of the turntable. According to another aspect of the invention, grasping means are provided across the face of the turntable to retain bales selectively positioned before the face of the turntable to thereby provide a layer of bales according to a predetermined configuration.

According to the present invention, the turntable and mast are mounted on tracks for reciprocal translation along a longitudinal axis of the vehicle to push accumulated layers of bales into a load carrying framework to form a stack of successive layers oriented for optimum frictional tying between the layers.

The variety of a layer configurations permitted by the combination of the elevator and rotating turntable permits maximum stability through frictional tying between successive layers and a bottom layer arrangement permitting transport of the formed stack after unloading by a squeeze forklift truck.

The invention further contemplates pivotally mounting the load carrying framework for vertically unloading the formed stack of bales onto a truck or onto the ground and also providing a self-unloading tailgate to automatically accomplish unloading of the vertically positioned stack.

Extendable and retractable feet are positioned at the rear of the vehicle to provide structural support during unloading of stacked bales from the self-unloading tailgate and thereby increase the load capacity of the vehicle.

By making maximum use of available space, the vehicle is streamlined for highway transportation yet has twice the bale carrying and stacking capacity of bale wagons heretofore made.

Other objects, features and advantages of the present invention will become apparent in the following specification and accompanying drawings.

FIG. 1 is a side elevational view of an automatic bale stacking vehicle embodying the present invention.

FIG. 1a is a detailed fragmentary side view showing the elevator operating mechanism and the base of the mast and turntable.

FIG. 2 is a front elevation view, in partial cross section of the automatic bale stacking vehicle.

FIG. 3 is a fragmentary plan view at the front of the bale stacking vehicle of the bale pickup conveyor, bale receiving turntable, and elevator.

FIG. 3a is a detailed front view of the bale receiving table and pivot mechanism, rotated 90°.

FIG. 3b is a fragmentary front elevation view of the elevator and stacking framework showing the operation of the short bale compensator mechanism.

FIG. 4 is a detailed side view of a bale hook provided on the turntable.

FIGS. 4a and 4b are detailed perspective views of a preferred bale hook mechanism for use on the turntable.

FIG. 5 is a cross-sectional view of the spindle positioned between the turntable and supporting mast for supplying fluid to the hydraulic cylinders and electricity to the controlling solenoid valves.

FIG. 6 is a front view of an electrical control program disc for controlling operation of the solenoid actuated hydraulic cylinders and motors.

FIG. 7 is a front view of make and break electrical contacts positioned on the turntable sprocket.

FIG. 8 is a front perspective view of the bale stacking framework.

FIG. 8a is a detailed side view of a hay dog.

FIG. 9 is a detailed fragmentary perspective view of the sidewall mounting on the bale stacking framework.

FIG. 10 is a detailed fragmentary view of the sidewall expansion mechanism.

FIG. 10a is another detailed fragmentary view of the sidewall expansion mechanism illustrated in FIG. 10.

FIG. 11 is a front view of the self-unloading tailgate.

FIG. 12 is a top view of the self-unloading tailgate.

FIG. 13 is a fragmentary side elevation view of the automatic bale stacking vehicle during an unloading operation.

FIG. 14 is a detailed fragmentary cross-sectional view of the unloading mechanism on the self-unloading tailgate.

FIG. 15 is a diagrammatic view of one possible configuration for the first layer of bales in a stack of a bales formed by the automatic bale stacking vehicle embodying the present invention.

FIG. 16 is a diagrammatic view of one possible configuration of succeeding alternate bale layers after the first layer shown in FIG. 15.

FIG. 17 is a diagrammatic view of a possible configuration of bale layers intermediate the bale layers of FIG. 16.

In the embodiment of the present invention illustrated in FIGS. 1 and 2 there is generally provided a wheel-mounted chassis structure 10 supporting a power plant 12 and transmission drive means 13 for driving a set of rear wheels 14 mounted on axle 15. To increase the load capacity and the unloading stability of the vehicle a second set of rear wheels 16 is mounted on dead axle 17 and driven by a V-belt drive 18 connected between the two pairs of rear wheels. Mounted at the front of the vehicle is a half-cab 20 for the vehicle operator which permits baled hay or other baled products to be received at the front of the vehicle adjacent the half-cab.

The bale handling equipment incorporated in the vehicle includes generally a bale pickup conveyor 30 positioned in front of the vehicle and adapted to lift bales onto a bale receiving table 40 positioned at the top of the bale pickup conveyor 30 and adjacent the half-cab 20. The bale receiving table 40 is rotatably mounted in two planes to orient the longitudinal axis of a received bale transversely across the vehicle and dump the bales lengthwise along an elevator 50 extending across the vehicle. The elevator 50 is adapted to raise a single bale or a pair of bales into position before a rotatably mounted vertical bale turntable 60. The bale turntable 60 includes grasping means 62 and is adapted to form layers of bales according to a programmed configuration to provide maximum tying stability between layers of bales. The turntable 60 is rotatably mounted on a mast 70 which is in turn mounted on rollers in a track for reciprocal translation along a longitudinal axis of the vehicle for depositing successive layers of bales in a stacking and load carrying framework 80. A self-unloading tailgate 90 rides along the stacking framework 80 in a position adjacent the first layer of bales as successive layers are deposited in the stacking framework 80 by the baled turntable 60.

THE BALE PICKUP CONVEYOR

Turning more particularly to the details of the elements of the combination, the bale pickup conveyor 30 as illustrated in FIGS. 1 and 2 comprises a framework extending forwardly of the vehicle and pivotally mounted on an axis 31 to ride on wheels 32 in front of the vehicle. A conveyor chain 34 having pickup lugs 33 is driven by a hydraulic motor 35 mounted on the vehicle. The flared guide arms 36 deflect bales on the ground with the longitudinal axis oriented in substantially the direction of motion of the vehicle onto the conveyor to be lifted to the bale-receiving table 40. With the bale pickup conveyor extending forwardly of the vehicle, the vehicle may be operated conveniently by an operator in the weather protected half-cab 20. When the bale pickup is not being used, it may be raised and pivoted about the axis 31 to rest above the bale receiving table adjacent the half-cab, thereby permitting highway transport.

BALE RECEIVING TABLE

Bales lifted upon the pickup conveyor 30 are deposited on the bale receiving table 40 positioned as illustrated in FIG. 3. As shown more clearly in FIG. 3a the bale receiving table includes a back wall 40a and a sidewall 40b for retaining a bale deposited thereon and is hingedly mounted along an axis 41 to a second bottom or extending arm 42 positioned beneath the bale table 40. The bale table 40 may thus be constructed as a double-bottom table. The second bottom or extending arm 42 is in turn connected to a shaft 43 pivotally enclosed by a sleeve 44 connected to the chassis structure. The shaft 43 is in turn connected through lever arm 45 to the piston rod 46 of a hydraulic ram or cylinder 47 fixed at its opposite end to the chassis structure. Upon operation of the hydraulic ram 47 the bale table 40 rotates about the pivot point formed by the sleeve 44 and shaft 43. Positioned behind the bale table 40 within the turning radius of the back wall of the turntable there is positioned a camming surface 48 comprising a curved wedge adapted to raise one side of the bale table upon rotation about the hinged axis 41 to thereby dump a bale on the elevator 50.

A pressure switch 49 positioned on the platform of the bale receiving table 40 may be provided to close the electric circuit to a solenoid operated switch which controls the hydraulic ram 47. Thus, a bale lifted by the pickup conveyor 30 with its longitudinal axis oriented in the direction of travel of the bale stacking vehicle is deposited on the bale receiving table 40 activating the solenoid switch 49 and hydraulic ram 47 to rotate the bale receiving table which engages the camming surface 48 and dumps the bale on elevator 50 with its longitudinal axis oriented in a direction transversely across the bale stacking vehicle.

ELEVATOR

The elevator 50 as illustrated in FIGS. 1 and 3 comprises an elongated panel extending transversely across the vehicle including a conveyor 51 which extends upwardly through a slit in the panel on the side on which bales are dumped from the bale receiving table 40. The conveyor 51 transports the bale dumped on the elevator part way across the elevator until it is centered in the elevator and extends over a pressure switch 52 which activates the elevator as hereinafter described. Alternatively, switch 52 is deactivated and a second bale from the bale receiving table 40 is dumped on the conveyor 51 which then pushes the first and second bales across the elevator to engage a second pressure switch 53 which also activates the elevator as hereinafter described. The side of the elevator opposite the conveyor is provided with a sidewall to prevent the bales from extending beyond the end of the elevator. On the side of the elevator adjacent the conveyor 51 there is provided a self-retracting extension 54 hingedly mounted at the elevator to provide further support for bales dumped on the elevator by the bale receiving table 40. Thus, bumps and vibrations of the bale are prevented from shaking the bale off the end of the elevator adjacent conveyor 51 by means of the extension 54. The extension 54 is retractable for highway travel.

Referring to FIGS. 1a and 2, a pair of supporting arms 55 are provided at each side of the vehicle for the elevator 50 extending forwardly of the elevator in the vehicle and terminating in a triangular brace connected at its upper corner to an axle 56 which extends across the vehicle between the supporting arms 55. The axle 56 is rotatably mounted in bearings 57 connected to the chassis of the vehicle. The lower forward corner of the triangular brace of each supporting arm 55 is connected to the piston of a hydraulic ram 58 fixed at its opposite end to the chassis of the vehicle. Thus, upon activation of each of the pair of cylinders 58 the elevator may be raised or lowered by rotation of the supporting arm 55 about the axle 56 produced by extension and retraction of the piston rod of the hydraulic cylinders. The hydraulic cylinders 58 are activated by solenoid valves, here not shown, which are in turn controlled by the electric pressure switches 52 and 53 positioned on the elevator panel as heretofore described. Thus, when pressure switch 52 is set to operate the solenoid valve which controls the pair of hydraulic rams 58, the elevator will be raised when one bale has been positioned and centered on the elevator. Alternatively, if switch 52 is deactivated, switch 53 will activate the solenoids to control the pair of hydraulic cylinders and raise the elevator when a pair of bales have been positioned on the elevator. Activation and deactivation of the electrical pressure switch 52 may be controlled by an electrical program disc as hereinafter described. Thus, either one or a pair of bales may be raised by the elevator 50 to a position before the layer forming turntable 60.

Actuating arms 59 may be provided, extending from the vehicle between the bale receiving table and elevator, to actuate an interruption switch to the bale receiving table 40 and prevent bales from being dumped by the table 40 when the elevator 50 is in a raised position. The arms 59 may be set to open the switch when pushed to the down position by a bale and to close the switch upon recovery to a raised position.

A short bale compensator for appropriately positioning a pair of bales on the elevator 50 when either or both of the bales are abnormally short bales may be provided so that the layers are well formed and so that irregularities due to varying bale sizes are distributed centrally of the final formed stack of bales. As illustrated in FIG. 3b, an hydraulic ram or cylinder 190 is fixed at its stationary end to the chassis 10 of the vehicle. At the other end of the hydraulic ram 190 the piston rod 191 is connected to a pivotally mounted arm 192 positioned to protrude through a slit in the floor of elevator 50 throughout a portion of the reciprocal pivotal movement of the arm 192 under action of the hydraulic cylinder piston rod 191. The hydraulic ram 190 is controlled by a solenoid valve which in turn may be operated by the electrical pressure switch 53 positioned at the far end of the elevator 50. At the end of the elevator 50 adjacent the pivotal arm 192 there is provided an index edge 193 protruding from the chassis of the vehicle or from the retracting extension 54 positioned at the end of the elevator 50. Thus, when a pair of bales is positioned on the elevator and transported by conveyor 51 against the electrical pressure switch 53, the hydraulic cylinder 190 is activated pivoting the arm 192 which engages the second bale moving it against the index edge 193. If either of the pair of bales is a short bale, the bales will then be positioned at the respective ends of the elevator, with the space due to either or both of the short bales centered between the bales. When the bales are raised by the elevator and positioned before the turntable 60, the hydraulic ram 190 retracts to return the arm 192 to its original position below the elevator floor. If the bales are regular size, the pivotally mounted arm 192 will merely press the second bale against the index edge 193 without further interfering in the layer forming and stacking process.

LAYER FORMING TURNTABLE AND SUPPORTING MAST

The vertical face 61 of the turntable 60 adjacent which bales are positioned by the elevator 50 is formed of a rectangular metal plate having slits formed therein for the extension and retraction of bale hooks 62 for grasping, retaining and depositing the bales positioned before the turntable. Instead of a metal plate or metal sheet, the face 61 of turntable 60 may be comprised of a lattice framework of struts and supports. The bale hooks would then be distributed about the lattice framework and pivotally mounted on the struts and supports comprising the face of the turntable and positioned to be extendable and retractable through the framework to grasp and retain bales of hay positioned before the turntable. By means of structural braces 63 the turntable is connected to a spindle 64 mounted for rotation within a supporting mast 70. The supporting mast 70 is a tripod structure having legs connected to a base 71 mounted on wheels 72 for reciprocal translation along track 73 in the chassis of the vehicle. A hydraulic ram 74 is provided in the front of the vehicle with its piston connected to the base 71 and its opposite end connected to the chassis for pushing and pulling the turntable and mast along the tracks 73 provided in the chassis. The extend of reciprocal translation by the bale turntable 60 and mast 70 is approximately one bale's width to thereby permit bales to be lifted by the elevator between the face of the turntable 60 and the stacking framework 80 and to further permit the layer forming turntable 60 to travel to the stacking framework 80 to thereby permit formed layers of bales to be pushed into the stacking framework 80.

A high torque hydraulic motor 79 is attached to the mast 70 to drive the sprocket 75 by roller chain 76 and thereby rotate the turntable 60 through specified degrees or angles of rotation. A roller bearing 77 is mounted on the mast 70 and extends rearwardly of the vehicle at a position to support the lower portion of turntable 60 during rotation and when at rest. A circular track 78 extending around the turntable on the side opposite face 61 abuts against the roller bearing 77 thereby supporting the turntable 60 and maintaining the turntable in a vertical position as the layers of bales are formed on the face of the turntable.

One-way latches 65 are provided about the edge of the turntable to permit bales to be inserted upwardly by elevator 50 between the face 61 of the turntable and the bale stacking framework 80 but which retain the bales after the elevator 50 is retracted. Similarly, a one-way latch 66 is provided on the chassis across from the one-way latches 65 fixed on the edges of the turntable 60 to further retain bales inserted between the turntable 60 and bale stacking framework 80 before the bale is grasped by bale hooks on the turntable.

Turning to FIG. 2, the front of the turntable 60 on the side opposite face 61 is provided with a plurality of rotatably mounted discs. In the embodiment of the invention illustrated in FIG. 2 three pairs of discs are provided. Each of the first pair of discs 201 is provided with a plurality of eccentrically mounted rods 202 pivotally connected at one end near the perimeter of the disc 201 and pivotally mounted at the opposite end to a bale hook.

As shown more clearly in FIG. 4, each bale hook 62 is pivotally mounted about an axis 203 formed by a strut or extension from the metal plate 61 forming the face of the turntable. The bale hook is adapted to extend onto or retract from the face of the turntable through a slit 204 formed therein, upon rotation of the bale hook about its pivotal axis 203 in response to extension and retraction of rod 202 pivotally mounted to the end of the bale hook at pivot point 205.

Each of the discs in the pair of discs 201 is provided with an eccentric extension 206 to which is pivotally connected one of the piston rods 207 of a double-acting hydraulic ram 208 positioned between the rotating discs 201. The double-acting hydraulic ram 208 provides reciprocal extension and retraction of the piston rods 207 thereby alternately rotating discs 201 back and forth through specified angular distances or degrees. Rotation of the discs 201 produces extension or retraction of the rods 202 relative to the corresponding bale hooks 62 producing rotation of the bale hooks about the respective pivoting axes 203. Thus, extension and retraction of the bale hooks is effected and controlled by the hydraulic cylinder 208.

A second pair of discs 210 similar to the pair of discs 201 is provided on the other side of the bale turntable 60 similarly provided with eccentrically mounted rods 211 connected to other bale hooks 62. The second set of rotating discs 210 are similarly controlled by piston rods 212 in a double-acting hydraulic ram 213. In each of the first two pairs of rotating discs 201 and 210, a lateral distribution of the controlled bale hooks is no greater than the width of a standard bale. Thus, each of the first pair of rotating discs is adapted to grasp and hold a pair of end-to-end bales as illustrated in outline in FIG. 2.

A third pair of discs 220 is provided between the first two pairs of rotating discs to control a plurality of bale hooks whose lateral distribution is no greater than the length of a standard bale. Thus, the third pair of discs 220 is adapted to grasp and retain four side-by-side bales as illustrated in FIG. 2. The third pair of rotating discs 220 are similarly controlled by a single double-acting hydraulic ram 222. It is thus apparent that each of the three pairs of rotating discs and corresponding bale hooks may be separately controlled by the respective double-acting hydraulic rams. Each of these hydraulic cylinders is operated by solenoid valves which are in turn controlled by an electrical program hereinafter described.

During the stacking operations, the layer forming turntable 60 is rotated successively in the same direction by hydraulic motor 79 and chain drive 76 thereby resulting in endless rotation of the turntable 60 in the same direction. Continuous fluid pressure for operation of the hydraulic rams which in turn operate the bale hooks and continuous electric contact for the solenoid valves which in turn control the bale hook hydraulic rams is provided by a spindle 64 mounted on the turntable 60 as illustrated in FIG. 5.

The face plate 61 and supporting struts 63 of the turntable 60 are connected to the armature or rotary portion 230 of the spindle. The armature 230 rotates within a sleeve or hub 231 on inclined roller bearings 232 and 233 which also serve to position the armature 230 within the hub 231. The spindle hub 231 is connected to the mast 270 which supports the turntable 60. Connected to the stationary spindle hub 231 is an oil collector sleeve 234 which axially encloses the rotating spindle armature 230 at the end adjacent the mast. Annular channels 235 and 236 formed in the oil collector sleeve 234 adjacent and encircling the armature 230 provide respectively an oil pressure channel and an oil return channel about the circumference of the spindle armature 230. The oil pressure channel 235 and oil return channel 236 are separated and isolated by O-ring seals 237.

Extending axially the length of the spindle armature 230 are an oil pressure passageway 240 and an oil return passageway 241 communicating respectively with the oil pressure channel 235 and oil return channel 236. Thus, during rotation of the spindle armature 230 within the spindle hub 231, oil under pressure from the oil pressure line 242 is continuously available through the oil pressure channel 235 and passageway 240 for operation of the bale hook hydraulic rams. Similarly, oil is continuously returned from the bale hook hydraulic rams through oil return passageway 241, oil return channel 236 to the oil return line 243.

An annular disc 245 connected to the stationary spindle hub 231 provides a circular current collector for electrical control of the solenoid valves which in turn control the bale hook hydraulic rams. The annular disc 245 is provided with a plurality of electrical connection points 246 and full circle annular electrodes 247 for current input. Adjacent and abutting the full circle annular electrodes 247 are electrode brushes 248 connected to the sprocket 75 of the turntable 60 and corresponding electrical connection points 250. Thus, upon rotation of the turntable 60 the electrode brushes 248 sweep continuously around the full circle annular electrodes 247 maintaining continuous electric contact. Current input to the electrical connection points 246 and electrodes 247 for appropriate control of the turntable and bale hooks is determined by the electric programmer hereinafter described.

The hydraulic cylinders or rams and hydraulic motors utilized in the stacking operation described herein are controlled by electrical solenoid valves, not shown in the drawings, which are in turn controlled by an electrical program to produce the desired sequence of steps in the stacking operation fully automatically as hereinafter described.

It is apparent that the arrangement of bale hooks and controlling hydraulic rams as illustrated in FIG. 2 may vary. Thus, other bale hook arrangements may be used forming layers of bales on the vertical turntable.

In one alternate embodiment of the present invention, a turntable is provided which does not continuously rotate in the same direction. The turntable reciprocates between two positions separated by a 90° rotation. Such a quarter-turn turntable thus undergoes only a 90° rotation and returns to is its original position by rotating in the opposite direction. In such an arrangement, the spindle 64 is not required and fluid pressure lines are provided directly from the mast 70 to the hydraulic ram or rams controlling the bale hooks. Rotation of the turntable is accomplished by a single hydraulic ram having its piston rod connected to an extension of the turntable and its opposite end affixed to a leg of the mast support 70. Such a turntable, though a simpler construction, is impractical for forming the layer configuration illustrated in FIGS. 16 and 17. The turntable would be applicable, however, for forming the layer configuration of bales illustrated in FIG. 15 and successive alternating layers at right angles to each other.

A preferred form of bale grasping hooks for the bale layer forming turntable 60 is illustrated in FIGS. 4a and 4b wherein pairs of opposing bale hooks 300 are mounted on rods 301, which rods are slidably mountable within guide tracks 302 fixed to the turntable wall on the side opposite the face 61 of the turntable. Each rod of a pair of rods 301 on which opposing bale hooks 300 are mounted are in turn connected by a pair of elongated connectors 303 to sliding members 304 connected respectively to the pistons 305 at opposite ends of a double-acting hydraulic ram 306. The double-acting hydraulic rams 306, controlling opposing pairs of bale hooks 300, are controlled by solenoid valves which are in turn controlled by the electric program disc as hereinafter described.

As illustrated in FIG. 4b, each rod 301 of a pair of rods supporting opposing bale hooks and slidably mounted in the guide track 302 is controlled by a pair of elongated connecting rods 303 connected together by a pivot 307 to the slide 304 shown in FIG. 4a. The pivot 307 is guided along a slot track 308 as the slide means 304 reciprocates back and forth under action by the double-acting hydraulic ram. The bale hook mounting rods 301 are in turn reciprocated within the slide track 302 to extend and retract opposite pairs of bale hooks 301 in opposing relationship through holes 310 in the face 61 of the bale layer forming turntable 60 to thereby grasp and retain bales 311 against the base 61 of the turntable as illustrated in FIG. 42.

LAYER FORMING OPERATION

In order to describe the bale layer an and stack forming operation, reference is made to FIGS. 15, 16 and 17. It is desirable that the first or bottom layer of bales be arranged in the configuration illustrated in FIG. 15 to permit lifting of the stack by a squeeze forklift truck. Thus, the eight standard dimension bales comprising the first layer are arranged in two side-by-side rows to permit the tines 226 of a squeeze forklift truck to enclose and retain under pressure all the bales of the first or bottom layer for transport of the stack of successive layers formed thereon.

In order to provide optimum frictional tying between successive layers and maximum stability for the formed stack of bales, it is desirable that successive alternate layers after the first or bottom layer be arranged according to the configuration illustrated in FIGS. 16 and 17. Thus, FIGS. 16 and 17 illustrate respectively the optimum arrangement for successive alternate eight-bale layers of standard dimension bales. FIG. 16 shows two pairs of end-to-end bales enclosing a row of four side-by-side bales and FIG. 17 shows the same arrangement rotated 90°. By such a configuration of bales, no separating crack between bales extends beyond the width of one bale around the outside of the stack. Thus, as illustrated in FIG. 1, successive bales around the outside of the stack alternate in a manner similar to brick laying thereby providing optimum stability for the stack. Such a tying arrangement between layers of bales in a stack, though done by hand previously, has never been accomplished automatically before the present invention.

In order to provide the stack configuration described above, the following stacking sequence is followed. During formation of the first or bottom layer of bales, switch 52 on the elevator 50 is deactivated so that end-to-end pairs of bales alone are raised by the elevator 50. First and second bales lifted by the pickup conveyor and dumped successively on the elevator are transported across the elevator by conveyor 51 to close the electric pressure switch 53 which operates the solenoid valves which in turn control the hydraulic cylinders 58. The elevator then raises the bales to a position between the face 61 of turntable 60 and drop-down panels 135 from the tailgate 90 which rides in tracks along the stacking framework 80 as hereinafter described. The first pair of bales is retained in position between the turntable 60 and drop-down panels 135 by the one-way latches 65 and 66 until a second, third and fourth pair of bales are successively raised by the elevator. When the four pairs of bales in the configuration of FIG. 15 are in position before the turntable 60, the turntable 60 and mast 70 then ride along the track 73 to push the first layer of bales into the stacking framework 80. The turntable may be first turned 90°.

In forming the second layer of bales, the electric pressure switch 52 on elevator 50 is activated so that single bales deposited by the bale receiving table 40 of the elevator 50 are centered in the elevator to activate the solenoids which in turn operate hydraulic rams 58 to lift the elevator and position the single bale at the bottom center of turntable 60. Successive single bales are so elevated until a side-by-side row of four bales is centered from top to bottom before the turntable 60. Bale hooks controlled by the third pair of rotating discs 220 on the opposite side of the turntable 60 are then operated to grasp the centered row of four side-by-side bales. The bale turntable 60 is then rotated 90°.

Electric pressure switch 52 on the elevator is again deactivated to permit a pair of bales to be raised in position below the four bales retained on the turntable by bale hooks. The bale hooks controlled by the second pair of controlled discs 210 are then activated to grasp and retain the pair of bales raised to position before the turntable. Upon lowering of the elevator, the bale turntable 60 is then rotated 180° to permit another pair of end-to-end bales to be positioned on the opposite side of the turntable. Upon positioning of the additional pair of bales in the remaining empty space of the bale turntable 60, the bale hooks controlled by the first pair of rotating discs 201 may then be at activated to grasp and retain the last pair of bales. A layer of eight bales in the configuration of FIG. 16 has thus been formed, and the turntable 60 and mast 70 are pushed forward along the tracks 73 by hydraulic ram 74 to push the first and second layers of bales back into the stacking framework 80. The turntable 60 is then rotated to permit formation of a third layer of bales in a fashion similar to formation of the second layer of bales. However, before the third layer of bales is pushed rearwardly into the stacking framework, the turntable 60 is rotated an additional 90° to suitably juxtapose the second and third layers for maximum tying stability as heretofore described. Successive layers are thus alternated until a full load of bales is formed. According to the present invention, a stack of seven layers may be formed for loading onto a truck. Thus, vertical height limitations for highway transport limit the height of stacked bales of standard dimension to approximately seven layers. Alternatively, a full load of 14 layers may be provided for ground stacking. Other stack sizes may also be provided.

An indexing stop may be provided for the rotating turntable so that the turntable fits squarely into the bale stacking framework when transferring layers of bales formed in the turntable.

PROGRAM CONTROL

The hydraulic cylinders or rams and hydraulic motors utilized in the illustrated embodiment of the present invention for stacking bales are controlled by electrical solenoid valves so that the stacking operation according to any particular sequence of steps may be accomplished fully automatically. In order to provide a fully automatic stacking operation for any particular sequence of stacking steps, an electric programmer 260 is provided for appropriate sequential control of the solenoid valves. As illustrated in FIG. 6, the electric programmer 260 comprises a wheel or disc 261 of nonconducting material such as a synthetic fiber and spaced protruding ribs or spokes 262. Intermediate spaced ribs 262 there is provided an array of plurality of electrically conducting contact points 263 set in the nonconducting disc 261. The disc is mounted for rotation about an axis 264 so that it abuts against and is in contact with a double row of spaced electrodes 265 and 266 fixed relative to the rotating disc in a position generally along a radial direction of the disc. The rows of electrodes 265 and 266 are spaced from each other out of electrical contact a distance less than the width of the electrical contact points 263 set in the rotating disc. As the disc rotates through successive positions the electrical contact points 263 successively bridge the gap between different electrodes in the rows 265 and 266 to complete electrical circuits for control of the appropriate solenoid valves. Thus, the electrical contact points 263 are positioned on the rotating wheel in an array to provide upon rotation of the disc to successive positions, the desired sequence of stacking operations.

The paired row of electrodes 265 and 266 are mounted on plate 269 to frictionally engage and abut against the electrically conducting contact points 263 as they sequentially bridge the gap between electrodes 265 and 266 to form closed circuits according to the program of the disc. The 10 pairs of electrodes 265 and 266 may thus control separate electrical circuits which in turn control the hydraulic ram 74 which pushes and returns the mast and turntable, the hydraulic rams 208, 213, and 222 which control the bale hooks on the turntable 60, the single bale elevator switch 52 and the hydraulic motor 79 for performing 90° turns and 180° turns of the turntable 60 as appropriately required.

Rotation of the disc is accomplished by a lever arm 267 which is actuated by the elevator arm 55 each time the elevator raises a bale or pair of bales into position before the turntable 60. On the lever arm 267 is hingedly mounted the disc advancing arm 268 biased by spring 270 to rest against the protruding ribs 262 of the disc 261. As the lever arm 267 hinged at axis 271 is raised by the elevator arm 55, the disc advancing arm 268 pushes against a rib 262 of the disc to advance the disc a unit distance thereby closing the appropriate electrical circuits for initiation of the next step in the stacking operation. The disc is maintained in position during any step of the operation by a brake lobe 272 which extends between ribs of the disc and is mounted on a rod 273 biased by spring 274. The electric programmer 260 is mounted adjacent the elevator in a position as illustrated in FIG. 2. It is apparent that a variety of different electric program discs may be used with different arrays of electrical contact points to provide a variety of step sequences in the stacking operation.

Thus, one appropriate sequence of steps for stacking bales according to the configuration of layers illustrated in FIGS. 15, 16 and 17 would be as follows: (1) The single bale elevator switch 52 which controls the elevator hydraulic rams 58 is deactivated to permit control of the elevator hydraulic rams 58 by the elevator switch 53. Successive pairs of end-to-end bales are thus positioned by the elevator 50 before the face 61 of turntable 60. (2) After four successive pairs of end-to-end bales are so positioned before the turntable 60, the hydraulic ram 74 is operated to push the mast 70 and turntable 60 rearwardly and in turn push the first layer of bales into the stacking framework 80. The turntable may be first turned 90°. The turntable is returned to its forward position. (3) The single bale elevator switch 52 is activated to control the elevator hydraulic rams 58 so that successive single layers of bales centered on the elevator are positioned before the turntable 60. (4) After four successive single bales are centered side by side before the turntable 60, hydraulic ram 22 is activated to operate the corresponding bale hooks to engage and grasp the for four centered and side-by-side bales against the face 61 of turntable 60. (5) The turntable hydraulic motor 79 is operated to rotate the turntable 60, 90°. (6) The single bale elevator switch 52 is deactivated to permit a single pair of end-to-end bales to be positioned by the elevator 50 before the turntable. (7) Hydraulic ram 213 on the turntable and corresponding bale hooks are activated to engage and grasp the single pair of end-to-end bales. (8) The turntable hydraulic motor 79 is operated to rotate the turntable 180°. (9) A second pair of end-to-end bales is positioned by the elevator 50 before the turntable 60. (10) Hydraulic ram 208 and corresponding bale hooks are activated to engage and grasp the second pair of end-to-end bales in position before the turntable. (11) The hydraulic ram 79 is operated to push the second layer of bales to the stacking framework 80. The turntable is returned to its forward position. (12) Hydraulic motor 79 is operated to rotate the turntable 90° and begin formation of the third layer of bales in a manner similar to the second layer of bales. However, at the end of formation of the third layer of bales, the turntable is rotated 90° before the third layer is pushed back into the stacking framework. Successive layers of bales are thus alternated as illustrated in FIGS. 16 and 17 to provide optimum tying between layers and maximum stack stability. It is apparent that a variety of operation sequences and stacking configurations may be provided with the present invention.

In order to provide precise control of the 90° and 180° turns of the turntable 60, a make-and-break current contact is provided for the hydraulic motor and sprocket 75. As illustrated in FIG. 7, three separate curved current contact and cutoff tracks are provided about the perimeter of the sprocket 75. Thus, current track 280 spans 180° of the perimeter and current tracks 281 and 282 each span 90° of the perimeter. The radius of curvature of the tracks is slightly less than that of the perimeter of the sprocket 75 and the tracks are positioned offcenter with respect to the center of the sprocket to provide transversely directed cutoff gaps between the tracks. Springloaded contact points 283 are fixed in stationary position to the mast support structure 70 at one end with the opposite ends in pressure engagement with current tracks 280, 280, 281 and 282.

Three of the electrodes on plate 269 positioned adjacent the electric programmer disc 261 control the current tracks for the two 90° turns and one 180° turn respectively. Circuits from these electrodes lead up the mast support 70 through the electrical contact point 246 brushes 248 to the electrical contact points 250 positioned on the rotating turntable 60. From The electrical terminals 250 on the turntable the three circuits are connected respectively to the two 90° current tracks and one 180° current track in the sprocket 250. From the spring-loaded contact points 283 the circuit is led to the solenoid valve which controls hydraulic motor 79. Thus, rotation of the turntable 60 through 90° and 180° turns is controlled precisely by the current tracks 281 and 282 and current track 280. When the spring-loaded contact point reaches the end of the corresponding current track along which electrical contact is made, the contact points fall off the raised edge of the track onto the next track thereby breaking the circuit to the motor to stop rotation of the turntable. Rotary motion or vibration of the sprocket 75 will not remake the circuit and restart the hydraulic motor 79 because the end of the preceding current track is positioned above the beginning of the next current track.

An alternate form for the electrical program disc illustrated in FIG. 6 is to provide a disc of a metal layer and a layer of nonconducting material such as masonite laminated together. The metal layer protrudes through the masonite layer at selected points to provide the control points 263 for making contact with a row of electrodes 265 on the plate 269. The metal layer of the disc is connected to the hot electrical lead and all solenoid valves are provided with a common ground. The solenoid valves are selectively activated as the disc rotates according to a predetermined sequence such as described above.

STACKING FRAMEWORK AND STACKING OPERATION

The elongated stacking and load-carrying framework 80 extends from the front of the vehicle, one bale's width from the layer-forming turntable 60, to a point behind the rear wheels. The framework includes a floor 81 and partial sidewall support structure 82, right-triangular in shape and positioned at the front along each side of the load-carrying framework. The partial sidewall structures 82 are pivotally mounted about a pivot axis 83 at the bottom rear corner of the right-triangular sidewall structures. The self-unloading tailgate 90 is mounted on wheels which ride in tracks 84 formed beneath the deck 81 of the load-carrying framework as illustrated in FIGS. 1 and 11. The wheel mounting for the self-unloading tailgate if is formed on extensions 91 from the bottom of the tailgate and includes a triangular array of wheels, an upper wheel 92 and lower wheel 93 spaced to engage the enclosing track 84 in the floor of the stacking framework 80 to provide stability for the tailgate as it traverses the length of the load-carrying framework. The load-carrying framework rests on the chassis structure and is pivotally mounted along a transverse axis 85 near the back of the vehicle. A large hydraulic cylinder or ram is connected between the chassis and the load-carrying framework at a point forward of the pivoting axis 85. The stacking framework 80 may thus be raised and pivoted to a vertical position for unloading by the hydraulic cylinder or ram 86.

The stacking and load-carrying framework 80 is further provided with supporting cables 87 and 88 such as aircraft cable extending along each side of the framework and mounted on pulleys at the front of the framework and pulleys on the self-unloading tailgate. As illustrated in FIGS. 1 and 11, from pulleys 94 and 95 mounted on the self-unloading tailgate, the cables 87 and 88 extend downward along the sides of the tailgate to pulleys 96 and 97, and extend inwardly around the pulleys to terminate at the cable equalizer bars 98. The cable equalizing bars 98, to which the cables 87 and 88 are respectively connected, are pivotally mounted on the pistons of hydraulic cylinders 100 respectively mounted at the bottom of each side of the self-unloading tailgate. The cable equalizers 98 equalize the pressure on the cables 87 and 88 as the tailgate rides along the floor 81 of the load-carrying framework as hereinafter described. Additionally, the hydraulic cylinders 100 provide means for adjusting the length of the cables during unloading as hereinafter described.

At the front of the stacking and loading framework cables 87 and 88 are fed respectively around the pulleys 101 and 102 and downward along the partial side support structures 82 to cables 103 fixed in the chassis of the vehicle as illustrated in FIGS. 1 and 13. From pulley 103 the cables 87 and 88 extend to the rear of the chassis and around horizontal pulleys 104, also mounted in the chassis and are then terminally fixed to a base portion 105 of self-unloading tailgate 90. It is thus apparent that the cables 87 and 88 operate as endless cables originating from and terminating at the self-unloading tailgate. As the self-unloading tailgate 90 traverses on wheels 92 and 93 along the enclosing track 84 in the deck of the load-carrying framework, cables 87 and 88 traverse pulleys 94 and 95, 101 and 102, 103, and 104 to maintain uniform tautness of the cables along the side of the load-carrying and stacking framework during the loading process and during transport of the stacked bales. The pivotally mounted cable equalizer bars 98 to which the cables 87 and 88 are connected equalizes the pressure along cables 87 and 88 during travel of the self-unloading tailgate 90 along the deck 81 of the load-carrying framework 80.

Referring to FIGS. 1 and 8, the forward end of the load-carrying framework 80, in which formed layers of bales are pushed by the bale layer forming turntable 60, is provided with pressure pads 110 on the sidewall support structures 82 and hay dogs 111 along the floor 81. The pressure pads and hay dogs are one-way frictional devices which permit a formed layer of bales to be pushed into the framework and which prevent the inserted layer of bales from falling or sliding forward. Thus, pressure pads 110 exert pressure along the sides of the formed layer of bales while the hay dogs 111 prevent the layer from sliding forward after insertion in the framework. As shown in FIG. 8a, the hay dog comprises a pivotally mounted rod 112 having one-way lugs 113 formed thereon and biased by spring 114. The hay dog is mounted on pivot point 115 in the deck 81 of the load-carrying framework so that one-way lugs 113 extend through a slit formed in the deck.

At the beginning of the bale-stacking process, the self-unloading tailgate 90 is positioned in the tracks 84 at the front of the stacking framework 80 in order to receive the first layer of bales from the bale layer forming table 60. Motion of the self-unloading tailgate 90 is accomplished by a relatively large capacity hydraulic cylinder or ram 120 positioned beneath the deck 81 of the stacking framework 80. The rear end 121 of the hydraulic cylinder 120 is fixed to the rear end of the load-carrying framework 80. At the forward end of the hydraulic cylinder 120, multiple turns of cables 123 and 124 are provided between a first pulley 125 mounted on the piston of the hydraulic cylinder 120 and a second pulley 126 mounted at the forward end of the stacking framework 80. One end of each of the cables 123 and 124 is respectively fixed at points framework. The other end of lever arm 184 is provided with a roller 185 adapted to ride along a camming surface 186 resting on the chassis 10 during the formation of a stack of bales, the camming surface attached to the chassis 10 extends upwards toward the deck 81 forcing the lever arm 184 and shaft 178 to an inwardly extending position. In that position, the sidewall structures 82 extend inwardly against the formed layers of bales with pressure pads 110 further maintaining the stacked bales in position within the framework. The forward edge of each of the sidewall support structures 82 is tapered to facilitate receipt of formed layers of bale from the turntable 60.

Upon raising the stacking framework 80 to a vertical position for unloading by the hydraulic ram 86, the front end of the stacking framework 80 rises above the chassis 10 so that roller 185 and lever arm 184 ride up the camming surface 186 connected to the chassis, permitting biasing springs 181 and 182 to force the shaft 178 and respective sidewall support structure to an outwardly extending position thereby releasing pressure against the top of the stack produced by the sidewall support structures and the pressure pads 110.

The extended position of shaft 178 during unloading is illustrated in phantom in FIG. 10a showing the position of the elements of the sidewall expansion mechanism after the stacking framework 80 has been raised above the camming surface 186 connected to the chassis 10.

The sidewall expansion and retraction mechanism may be suitably housed at the front of the stacking framework 80 beneath the deck 81 with suitable slits provided for operation of the shaft 178.

Alternatively, a double-acting ram positioned between the sidewall support structures and connected by extending piston rods to the shafts 178 could be utilized for expansion and retraction of the sidewalls during unloading and loading.

During unloading, the cables 87 and 88 are also slacked to facilitate removal of the stack of bales. This is accomplished by hydraulic cylinders 100 which retract the cable equalizers 98 to thereby increase the length of cables 87 and 88 along the length of the stacking framework 80.

I claim:

1. An automatic bale stacking vehicle comprising: a moveably mounted chassis; bale pickup means mounted on said chassis and adapted to receive and lift bales from the ground onto the vehicle; elevator means mounted on the chassis and positioned to receive bales from said bale pickup means and raise the received bales in a substantially vertical direction; a rotatably mounted substantially vertical turntable means mounted on the chassis having a substantially vertical face, positioned above said elevator means whereby bales may be positioned by the elevator means adjacent the face of said turntable means, said turntable means having formed thereon a plurality of bale grasping means across the face thereof whereby bales positioned adjacent the face of the turntable means by the elevator means may be grasped and retained adjacent the turntable means to form layers of bales in predetermined configurations, said turntable means also being mounted for longitudinal translation on said chassis; and stacking framework means mounted on the chassis spaced from the turntable means wherein formed layers of bales may be deposited by the turntable means.

2. An automatic bale stacking vehicle as set forth in claim 1 wherein said bale pickup means comprises a bale pickup conveyor adapted to receive and lift bales from the ground and bale orienting means positioned adjacent the bale pickup conveyor and adapted to receive bales from the conveyor, orient the bales and deposit them on said elevator means.

3. An automatic bale stacking vehicle as set forth in claim 2 wherein said bale orienting means comprises a bale receiving table pivotally mounted in two planes whereby the longitudinal axis of bales received from said bale pickup conveyor onto the bale receiving table may be oriented in a predetermined direction and whereby said bale may be dumped on said elevator means.

4. An automatic bale stacking vehicle as set forth in claim 2, wherein said elevator means comprises an elongated panel extending transversely across the chassis and wherein said orienting means deposits bales on said elevator means with the longitudinal axis of the bales oriented parallel to the elongated axis of the elevator means.

5. An automatic bale stacking vehicle as set forth in claim 4 wherein said elevator means is provided with conveyor means adapted to transport a first bale longitudinally across the elevator and wherein a second bale deposited on said elevator means pushes the first bale across to one side of the elevator.

6. An automatic bale stacking vehicle as set forth in claim 5 wherein there is provided short bale compensator means comprising a reciprocating arm positioned beneath said elevator means and adapted to engage said second deposited bale and to push said second deposited bale adjacent an index edge positioned at the side of the elevator means opposite the first bale.

7. An automatic bale stacking vehicle as set forth in claim 1 wherein said moveably mounted chassis is provided with a power plant and transmission means for self-propulsion, and wherein means is provided for maneuvering the vehicle.

8. An automatic bale stacking vehicle as set forth in claim 7 wherein said power plant and transmission means are adapted to drive a first set of wheels coaxially mounted, and wherein said first set of wheels is adapted to drive a second set of coaxially mounted wheels by a V-belt drive.

9. An automatic bale stacking vehicle as set forth in claim 7 wherein said bale pickup means is positioned in front of the chassis and wherein the bale pickup means is retractable for high speed travel.

10. An automatic bale stacking vehicle as set forth in claim 1 wherein said elevator means is adapted to raise single bales and rows of bales, and wherein control means are provided on said elevator for raising single bales and rows of bales.

11. An automatic bale stacking vehicle as set forth in claim 10 wherein said elevator means comprises an elongated panel adapted to receive bales thereon with the longitudinal axis of the bales oriented parallel to the elongated axis of the elevator means and wherein said elevator means is controlled by pressure switches actuated by the bales to raise single bales and rows of bales.

12. An automatic bale stacking vehicle as set forth in claim 1 wherein the bale grasping means on said vertical turntable comprises pivotally mounted bale hooks adapted to extend and retract through the face of the vertical turntable means.

13. An automatic bale stacking vehicle as set forth in claim 12 wherein said elevator means, vertical turntable means, and bale hooks are controlled by hydraulic cylinders and hydraulic motors, wherein said hydraulic cylinders and hydraulic motors are controlled by electrical valves, and wherein said electrical valves are controlled by electric program means to produce a predetermined sequence of operation of said elevator means, vertical turntable means, and bale hooks.

14. An automatic bale stacking vehicle as set forth in claim 1 wherein said vertical turntable is adapted to rotate endlessly in the same direction, and wherein means is provided to rotate said turntable.

15. An automatic bale stacking vehicle as set forth in claim 1 wherein said vertical turntable means is adapted to reciprocate between two positions separated by a predetermined angle of rotation, and wherein means is provided to reciprocate said turntable.

16. An automatic bale stacking vehicle as set forth in claim 1 wherein said stacking framework means is pivotally mounted on said chassis to facilitate unloading of vertical stacks of layers of bales deposited in said stacking framework means by said vertical turntable means.

17. An automatic bale stacking vehicle as set forth in claim 16 wherein said stacking framework is provided with a traveling tailgate means adapted to travel along the length of the stacking framework means and receive and support layers of bales deposited in the stacking framework means by the verti- 127 and 128 at the forward end of the framework. From there the cables undergo multiple turns between the pulleys 125 and 126 returning to pulleys 131 fixed at the forward end of the stacking framework 80. The pulleys 131 are respectively mounted adjacent the forward ends of tracks 84 in the deck 81 of the stacking framework 80 so that the cables 123 and 124 may extend around the pulleys 131 and through the length of the tracks 84 to be tied at the opposite end to the base of the self-unloading tailgate 90. It is thus apparent that contraction of the piston in hydraulic cylinder 120 will cause the self-unloading tailgate 90 to travel forward in the tracks 84 to the front of the stacking framework 80. Because a reverse mechanical advantage results by using multiple turns of the cables 123 and 124 to obtain a relatively long travel by the self-unloading tailgate 90 for a short travel by the piston of hydraulic cylinder 120, a relatively large capacity hydraulic cylinder is required such as a 7-inch diameter 2,000 p.s.i. hydraulic ram.

Since the face of the self-unloading tailgate 90 does not reach the front of the stacking framework 80 when the tailgate is in its foremost position in the tracks 84, drop-down panels 135 are provided mounted on hinged arms 136 connected between the drop-down panels 135 and the tailgate 90 as illustrated in FIG. 1. The drop panels as shown in FIGS. 11 and 12 are broad panels which retract into recesses 136 formed in the tailgate 90. With the tailgate 90 at its foremost position in the tracks 84 in the deck of the stacking framework 80, the drop panels 135 are in an extended position to guide and support the bales positioned by elevator 50 between the layer-forming turntable 60 and drop panels 135. As the first formed layer of bales is pushed rearwardly by the turntable 60 into the stacking framework 80, the drop panels 135 are retracted on the hinged arms 136 into the tailgate 90 as illustrated in the foregoing FIGS. As successive layers of bales are pushed into the stacking framework by the turntable 60, the tailgate 90 positioned adjacent the first layer of bales retracts under pressure from the turntable 60 and intervening layers of bales. The hydraulic cylinder 120 is suitably opened to permit the tailgate 90 to recede during formation of the stack of bales. After a stack of suitable size has been formed, it is ready for transport in the stacking and load-carrying framework 80 and for subsequent unloading.

SELF-UNLOADING TAILGATE AND UNLOADING OPERATION

The stacking and load-carrying framework 80 is pivotally mounted along an axis 85 at the rear of the chassis of the vehicle to permit unloading of a vertical stack of bales. The hydraulic ram 86 fixed between the chassis and the load-carrying framework at a point forward of the pivoting axis 85 raises and rotates the stacking and load-carrying framework to a vertical position for unloading as illustrated in phantom in FIG. 1 and as shown in FIG. 13. Adjacent the pivotal axis 45 there is provided a downwardly extending foot or platform 140 pivotally mounted on the piston of an hydraulic cylinder 141 which is itself hingedly mounted to the chassis of the vehicle. The extending foot or platform 140 may be braced against the ground by hydraulic ram 141 to support and brace the vehicle during the unloading and increase the unloading capacity of the vehicle.

When the stacking and load-carrying framework has been raised and rotated to a vertical position by the hydraulic cylinder 86, the stacked bales are supported by the tailgate 90 positioned along the track 84 in the deck 81 of the stacking framework 80. The standard bale dimensions are such that a vertical stack of seven layers of bales would normally constitute the limit of vertical height for a highway transport truck on which the bales may be unloaded. The formed stack of seven layers of bales would be lowered on tailgate 90 by hydraulic cylinder 120 onto the deck 141 of a transport truck as illustrated in FIG. 13. Alternatively, the formed stack of bales may be loaded directly on the ground by lowering the tailgate 90 to the ground level. In that event, the full capacity of the stacking vehicle may be used to form the ground stack. A vehicle such as described herein may readily handle a stack of 14 layers of bales, each layer comprised of eight standard-dimension bales. With the tailgate 90 in position on the deck of a transport truck or on the ground, the formed stack is unloaded by the self-unloading mechanism on the tailgate.

As illustrated in FIGS. 1, 11 and 14, a pair of rotatably mounted elongated worms or screws 150 extend from the bottom to the top of the tailgate 90. The screws 150 are rotated by hydraulic motor 151 by means of a pair of roller chains 152 connected between a pair of drive sprockets 153 mounted on the motor and a pair of driven sprockets 154 mounted respectively on each of the screws 150.

A pair of internally threaded sleeves 155 axially enclose the screws 150, adapted to traverse the length of the tailgate upon rotation of the screws. The screws and sleeves 155 are mounted within the tailgate 90 and a guide track 156 is provided within the tailgate to guide the sleeve as it traverses the length of the screws. Rollers 157 may be provided in the sleeve to traverse the guide track 156. An extension 158 from the sleeve 155 through a slit formed in the tailgate connects the traveling sleeve 155 to an L-shaped panel 160 which normally rests across the width of the vehicle at the joints between the tailgate 90 and the deck 81 of the stacking framework 80. Upon rotation of the screws 150, the sleeves 155, extensions 158 and L-shaped panel 160 travel the length of the screws across the tailgate.

Since the first layer of bales rests within the L-shaped panel 160, a formed stack of bales is translated across the tailgate onto the ground or onto a waiting truck. The self-unloading tailgate thus restricts the forces and stresses of unloading to the tailgate region of the truck. The forces of unloading are not transmitted through any portions of the stacking framework or vehicle chassis. As unloading of the stack of bales takes place, the truck may be pushed forward as frictional engagement between the stack of bales and the ground or the deck of a transport truck increases.

In order to facilitate unloading, pressure on the bales of the formed stack from the partial side support structures 82 and the cables 87 and 88 is released before the stack of bales is unloaded from the truck by the self-unloading tailgate. As illustrated in FIG. 9, each side support structure 82 at the front of the stacking framework 80 is provided at the top and bottom with a pair of sleeves 180 axially enclosing a rod 171 at the top and the bottom of the side support structure. At the bottom of the sidewall, the rod 171 is connected near one end of an arm 172 which is pivotally mounted at its other end to the deck 81 of the stacking framework at pivot point 173. At the top of the sidewall, the top rod 171 is similarly connected to the end of an arm 174 pivotally mounted at its other end at pivot point 175. The pivot point is provided by a rod 176 extending across the top of the framework terminating at each end in a knuckle 177 which engages the pivot point 175 to maintain the pivot point in a substantially stationary position relative to the other end of arm 174 to which the rod 171 is connected. A lever shaft 178 hingedly connected to the arm 172 at the bottom of the sidewall is adapted to extend and retract to thereby extend and retract the rod 171 about the pivot point 173 and 175. Because the rod 171 may freely rotate within sleeves 170 connected to the sidewall structure 82, the sidewall structure will also extend and retract about its pivot point 83 as the shaft 178 extends and retracts.

One method of extending and retracting the shaft 178 for unloading and loading is illustrated in FIG. 10. As shown in that FIG. the shaft 178 extends through a guide channel 183 attached to a pivotally mounted lever arm 184 near the front of the stacking framework. The shaft 178 is biased in an outwardly extending position by springs 181 and 182. Spring 182 axially encloses the shaft 178 between the guide channel 183 and a stop washer 180 fixed to the end of the shaft 178. The guide channel 83, biased by spring 182 abuts against the lever arm 184 which is pivotally mounted at one end to the stacking cal turntable means, the first deposited layer being positioned adjacent the traveling tailgate means, said tailgate means being adapted to support a stack of layers of bales deposited thereon when the stacking framework means is rotated to a vertical position for unloading.

18. An automatic bale stacking vehicle as set forth in claim 17 wherein said traveling tailgate is provided with unloading means comprising a panel connected to the tailgate adjacent the bottom of the stacking framework and means for sliding the panel across the tailgate to thereby unload a stack of bales formed thereon when the stacking framework means is rotated to a vertical position for unloading.

19. An automatic bale stacking vehicle as set forth in claim 18 wherein said stacking framework means is provided with side support means for supporting stacks of bales deposited therein and wherein said side support means may be released from supporting engagement with the stack bales to permit unloading.

20. An automatic bale stacking vehicle as set forth in claim 16 wherein extending feet are provided at the rear of the chassis extendable to engage the ground and support said vehicle upon rotation of the bale stacking framework means for unloading.

21 An automatic bale stacking vehicle as set forth in claim 1 wherein the face of said turntable means is comprised of a planar sheet of material having holes formed therein for the grasping means.

22. An automatic bale stacking vehicle as set forth in claim 1 wherein the face of said turntable means is comprised of a lattice framework of struts and supporting means.

23. An automatic bale stacking vehicle comprising: bale pickup conveyor means adapted to receive and lift bales from the ground; bale orienting means positioned adjacent and adapted to receive bales from the bale pickup conveyor means, orient said bales, and deliver said bales; elevator means adapted to receive bales from said bale orienting means and raise the bales in a substantially vertical direction; rotatably mounted substantially vertical turntable means having a substantially vertical face positioned above said elevator means whereby bales may be positioned by said elevator means adjacent the vertical face of said turntable means, said turntable means having bale grasping means formed thereon across the face thereof adapted to grasp and retain bales positioned adjacent the face by said elevator means whereby layers of bales may be formed thereon according to predetermined configurations, said turntable means also being mounted for longitudinal translation on said chassis; and bale stacking framework means wherein formed layers of bales may be deposited by said vertical turntable means to form a stack of layers of bales, said bale stacking framework means being rotatably mounted; means for rotating said bale stacking framework 90° to permit unloading of vertical stacks of layers of bales deposited therein.

24. An automatic bale stacking vehicle as set forth in claim 23 wherein there is provided traveling tailgate means mounted on said stacking framework means adapted to receive and support layers of bales deposited in said stacking framework means and travel along the length of the stacking framework means; and unloading means comprising a panel connected across the tailgate means at the side adjacent the bottom of the bale stacking framework and means housed in the tailgate for sweeping the panel across said tailgate whereby stacks of layers of bales positioned on the tailgate may be unloaded when the bale stacking framework is rotated to a vertical position.

25. An automatic bale stacking vehicle as set forth in claim 23 wherein said wheel supported chassis is provided with a power plant and transmission means for self-propulsion and means for maneuvering the vehicle and wherein said bale pickup conveyor means is retractable to permit high-speed travel of the vehicle.

26. An automatic bale stacking vehicle as set forth in claim 25 wherein there is provided at the front of the chassis a half-cab and wherein said bale pickup conveyor is positioned adjacent the half-cab at the front of the chassis.

27. An automatic bale stacking vehicle as set froth in claim 23 wherein said bale pickup and conveyor means is positioned at the front of the chassis.

28. An automatic bale stacking vehicle comprising: a moveably mounted chassis; a rotatably mounted substantially vertical turntable means mounted on the chassis having a substantially vertical face, said turntable means having formed thereon a plurality of bale grasping means across the face thereof adapted grasp and retain bales adjacent the turntable face to form layers of bales according to predetermined configurations, said turntable means also being mounted for longitudinal translation on said chassis; means for positioning bales adjacent the face of said turntable means; and stacking framework means mounted on the chassis spaced from the turntable means wherein formed layers of bales may be deposited by the turntable means.

29. An automatic bale stacking vehicle as set forth in claim 28 wherein said bale grasping means comprises a plurality of opposing pairs of bale hooks extendable and retractable through openings formed in the face of the vertical turntable means, and means for extending and retracting said bale hooks.

30. An automatic bale stacking vehicle comprising: a movably mounted chassis; a vertical table means mounted on the chassis having a vertical face, said table means having formed thereon a plurality of bale penetrating means across the face thereof adapted to penetrate and grasp and retain each bale positioned adjacent the table face to form layers of bales according to predetermined configurations, all the bales of each of said layers being individually held against said table means by said penetrating means, said table means mounted for longitudinal translation on said chassis; means for positioning bales adjacent the face of said table means for grasping by said bale penetrating means; and stacking framework means mounted on the chassis adjacent the table means wherein formed layers of bales may be deposited by the table means.